United States Patent [19]

Harrison

[11] Patent Number: 4,844,559
[45] Date of Patent: Jul. 4, 1989

[54] ELECTRICALLY OPERATED SOLENOID VALVE

[75] Inventor: Anthony W. Harrison, Birmingham, England

[73] Assignee: Lucas Industries public limited company, Birmingham, England

[21] Appl. No.: 273,342

[22] Filed: Nov. 18, 1988

[30] Foreign Application Priority Data

Nov. 20, 1987 [GB] United Kingdom ............... 8727297

[51] Int. Cl.⁴ .................. B60T 8/00; B60T 13/68
[52] U.S. Cl. ..................... 303/119; 251/129.02; 251/129.15
[58] Field of Search ............ 303/119, 15, 110, 61–63, 303/68–69; 188/181 A, 181 R; 251/129.14, 129.01, 129.02, 129.03–129.22; 137/596.17, 625.65

[56] References Cited

U.S. PATENT DOCUMENTS

| | | | |
|---|---|---|---|
| 3,719,401 | 3/1973 | Peruglia | 303/119 |
| 3,880,476 | 4/1975 | Belart et al. | 303/119 |
| 3,921,666 | 11/1975 | Leiber | 303/119 X |
| 4,050,749 | 9/1977 | Harris et al. | 303/119 |
| 4,138,165 | 2/1979 | Blomberg et al. | 303/119 |
| 4,655,255 | 4/1987 | Rode | 303/119 X |
| 4,668,024 | 5/1987 | Nakanishi et al. | 303/119 |
| 4,679,589 | 7/1987 | Inden et al. | 303/119 X |

Primary Examiner—Douglas C. Butler
Attorney, Agent, or Firm—Staas & Halsey

[57] ABSTRACT

An electrical solenoid valve has a coil and a movable armature. A first valve element is subject to pressure from an inlet and a second valve element is operated by the armature, when the coil is energized, to close a port in the valve element and so isolate the inlet from a pressure fluid outlet to a brake. The valve element is displaceable under the effect of a pressure differential across it as a result of closing the port, the force derived from the then predominant inlet pressure being transmitted by the second valve element to load a spring device connected to the armature. Such spring loading increases the force tending to release the armature and leads to rapid opening of the port (18), when required.

17 Claims, 4 Drawing Sheets

ELECTRICALLY OPERATED SOLENOID VALVE

This invention relates to an electrically operated valve for use in a working system in which it is necessary repeatedly to isolate a fluid pressure source from a working device. One example of such a working system is a vehicle anti-skid braking system of the general kind in which, during the existence of an incipient skid condition, a brake-actuating master cylinder is isolated from the brake and a de-boost device is operative to reduce the braking pressure and thereby temporarily release the brake.

An object of the invention is to provide an electrically operated valve of simple construction which facilitates the control of the isolation function when the valve is installed in an apropriate system.

According to the invention, an electrically operated valve comprises an armature displaceable by an electrical motive device from a rest position to an operative position, a pressure-responsive device subject, in use, to an inlet pressure via a pressure fluid inlet, and a valve element acting, upon displacement of the armature towards its operative position as a result of actuation of said motive device, to close a port between the pressure inlet and a pressure outlet to a working system so as to isolate said inlet and outlet from one another, said pressure-responsive device being subjected to a pressure differential as a result of closing the port, and being displaceable under the effect of a force derived from the then predominant inlet pressure, causing said force to be transmitted by force transmission means to load the armature towards said rest position.

According to the invention, an electrical solenoid valve comprises a coil and an associated movable armature, a first valve element subject, in use, to an inlet pressure via a fluid pressure inlet, a second valve element operable by action of the solenoid armature, when the solenoid is energised, to close a port and thereby isolate the pressure inlet from a fluid pressure outlet connected, in use, to a braking system, the first valve element being displaceable when a pressure differential arises across it as a result of closing the port, such displacement being under the effect of force derived from the predominant inlet pressure, which force is transmitted by thrust means to load a spring device connected to the solenoid armature, such as to increase the force tending to release said armature.

Preferably, the thrust means is constituted by the second valve element which conveniently provides a valve seat in one end region thereof for co-operation with said port and co-operates at its other end with the spring device.

The pressure-responsive means, typically of disc-like form, may conveniently be such as to resist significant deflection under the effect of rapid transient pressure differential thereon, caused, for example, in use, by actuation of a master cylinder for normal braking, but deflects to load the armature when an established pressure differential occurs, for example, under brake de-boost conditions.

The invention will now be described, by way of example, with reference to the accompanying drawings in which.

Figure 1:
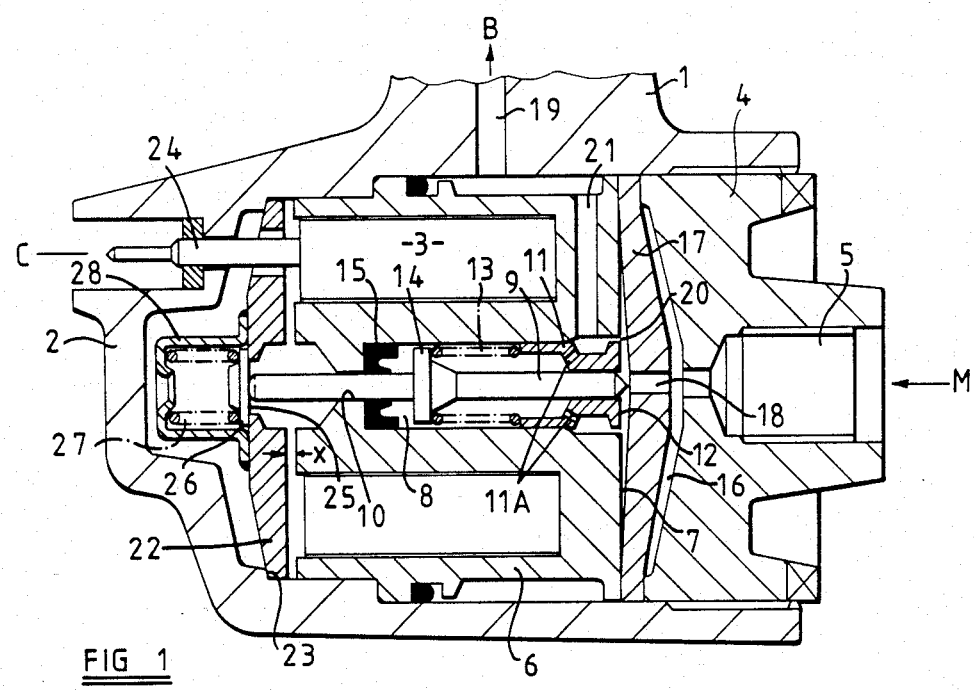
FIG. 1 is a longitudinal cross-section through one form of the solenoid valve of the invention.

Referring to FIG. 1, the solenoid valve illustrated therein has a casing 1 with one closed end 2 and housing a solenoid coil 3, the opposite open end of the casing being closed by a screw threaded closure member 4 which incorporates an inlet port 5 for hydraulic fluid. The coil 3 is mounted on a core 6 which presents a flat surface 7 at its right hand end, for the purpose to be described, and has a through bore 8 housing a valve stem 9, the latter being supported for sliding movement in a reduced diameter bore portion 10 of the core 6 and in a fixed insert 11 press-fitted into the bore 8 and presenting a flat end surface 12 flush with the surface 7. The valve member 9 is urged to the left, as seen in the drawing, by a light spring 13 engaged between a flange 14 of the valve stem and the opposed end of the insert 11. A seal 15 surrounds the valve stem 9 to provide a fluid-tight barrier between the part of the housing at the right hand side of the core 6 containing hydraulic fluid, and the part of the housing to the left of the core which contains no fluid.

A pressure-chamber 16 is defined between the closure member 4 and the face 7 of the core 6, the chamber 16 containing a semi-rigid diaphragm 17, which is trapped around its outer peripheral area between the core 6 and closure member 4. The diaphragm has a fluid port 18 therethrough which normally provides communication between the inlet port 5 and an outlet port 19 via a space 20 between the insert 11 and core 6 and a radial passage 21 of the core, and/or through the insert 11 around the stem 9 and through radial passages 11A of the insert.

At the left hand end of the housing 1, a disc-like solenoid armature 22 is supported at its outer periphery against the inner wall of the housing for axial sliding movement, the leftward extent of such movement being limited by a shoulder 23. Electrical supply connections 24 to the coil 3 extend through the armature at locations adjacent its radially outer periphery. The armature also has a generally central aperture 25 through which the stem 9 passes for engagement with an abutment washer 26 which is urged into firm engagement with the armature by a spring 27 housed within a cage 28 securely fixed to the outer surface of the armature, as by welding for example.

In its form as illustrated, the valve would normally be incorporated in a vehicle anti-skid braking system with the inlet 5 connected to an hydraulic master cylinder M and the outlet 19 connected to one or more brake actuators B. The electrical supply connections 24 convey signals from an electronic controller C, signals resulting from the detection of an incipient wheel skid condition by a wheel speed sensor (not shown) in conventional manner.

In normal conditions, when no incipient skid is sensed at the wheel to be braked, the valve is in its illustrated condition and actuation of the master cylinder injects fluid under pressure through the inlet 5, chamber 16, port 18, space 20, passage 21 and the outlet 19 into the brake actuator B. The components of the valve will remain in their illustrated positions during this normal braking operation with perhaps a slight inward deflection of the diaphragm 17 due to the pressure drop across this component. In the illustrated condition of the valve, the maximum gap 17A between the diaphragm 17 and surface 7 of the core 6 (illustrated to a larger scale in FIG. 2) must be less than the solenoid-actuated travel 9B of the valve stem 9 to ensure that this can always be withdrawn from the port 18 to connect the inlet 5 and outlet 19. The solenoid travel 'X' (FIG. 1) should be equal to or slightly greater than the valve travel 9B to ensure reliable valve closure.

Figure 2:
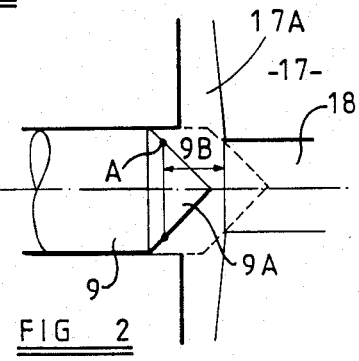
FIG. 2 is an enlarged detail of part of the valve of FIG. 1.

In the event that a skid condition is sensed while the system is still pressurised by the master cylinder, the controller C will provide a signal at the connections 24 to energise the coil 3 which attracts the armature 22, moving it to the right and urging the valve stem 9 in the same direction, bringing the free end of the stem into an obturating position within the port 18, such position being indicated in broken lines in FIG. 2. This has the effect of isolating the master cylinder from the brake actuator and the latter can be de-boosted by a suitable de-boosting device (not shown) under the action of the controller to release the brake. The fall in pressure at the left hand side of the diaphragm 17 produces a significant pressure differential across the diaphragm sufficient to cause this to be deflected by the inlet pressure and thereby brought into firm engagement with the surfaces 7 and 12 of the core 6 and insert 11 respectively.

As will be seen more clearly from FIG. 2, the port 18 is of somewhat smaller diameter than the valve stem 9 and only a portion of a nose 9A of the stem enters the port, the outer edge of the latter engaging the nose at diameter A. Thus, when the diaphragm 17 deflects leftwardly, the stem 9 is also moved leftwardly and, due to its constant with the washer 26, loads the spring 27 by virtue of the force derived from the then predominant master cylinder pressure acting on the right hand side of the diaphragm.

Figure 1A:
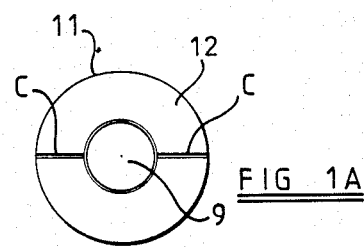
FIG. 1A is a "scrap" view of FIG. 1.

When the skid condition ceases, the solenoid is de-energised, releasing the armature 22 which moves rapidly back to its position against the shoulder 23 of the housing under the action of the aforesaid force built up in the spring 27, which causes rapid and reliable release of the armature. Simultaneously, the stem 9 is able to move to the left under the action of the spring 13. If the master cylinder pressure is greater than it was when the valve assumed its isolating condition the diaphragm 17 is retained against the face 7 and pressure leaks slowly through the gap 20, and/or around the stem 9 and through the openings 11A, to the actuator in order to equalize the pressures at either side of the diaphragm, whereupon the diaphragm resiliently recovers its original shape and comes to rest in the position illustrated, once more permitting substantially uninterrupted communication between the master cylinder and actuator. This pressure equalization process prevents an untoward rate of rise in the re-applied brake pressure and enables the anti-skid system to respond more readily to the occurrence of a subsequent incipient skid condition. In the event that negligible flow is possible around the stem 9, one or more grooves C may be provided in the face 12, as illustrated in the scrap view of FIG. 1A, to provide a controlled partial re-pressurising of the brake actuator prior to opening of the diaphragm port 18.

Should the master cylinder pressure fall below that in the brake actuator at any time while the diaphragm 17 is deflected against the surface 7, the then predominant pressure at the outlet side of the diaphragm will, even with the solenoid energised, urge the diaphragm to an extreme position rightwards of the position illustrated, in which extreme position it abuts the closure member 4. This ensures that the valve stem is withdrawn from the port 18 under this condition so that there can never be a significant excess of brake pressure in the brake actuator, as compared with that demanded by actuation of the master cylinder.

Should the electrical power supply to the valve fail, the solenoid will be instantly released, enabling the valve stem 9 to disengage from the diaphragm port 18 and thus reconnect the master cylinder to the brake actuator for direct hydraulic actuation. The valve will thus be seen to provide inherently "fail-safe" anti-skid brake control.

Figure 3:
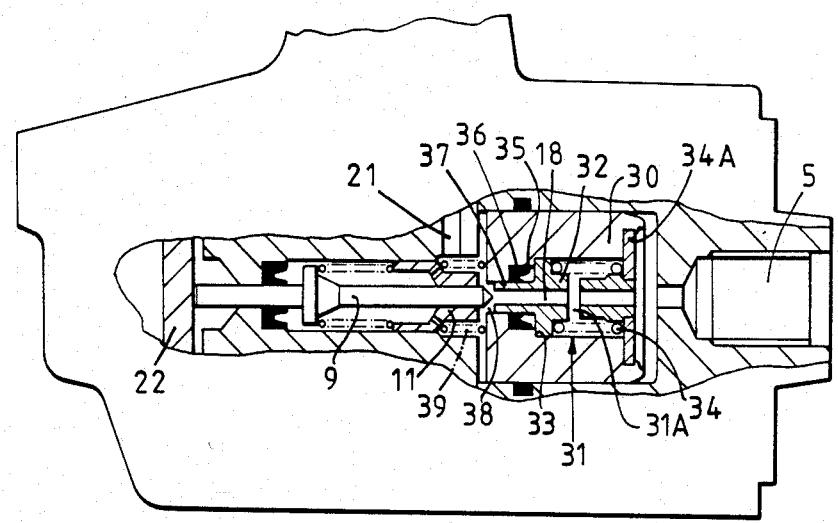
FIGS. 3, 4, 5, 6 and 7 are respective views similar to FIG. 1 of alternative embodiments of the valve of the invention.

The alternative embodiment illustrated in FIG. 3 is similar to FIG. 1, except that the diaphragm 17 of FIG. 1 is replaced by a piston 30 subject to the inlet pressure at the inlet 5 and having an internal stepped bore 31, of which a larger diameter portion 31A contains a valve element 32, normally urged against a shoulder 33 of the bore by a spring 34 reacting against a bore closure member 34A. An intermediate portion 35 of the bore houses a seal 36, and a hollow part 37 of the valve element extends through a smaller diameter bore portion 38 for co-action with a valve stem 9 arranged as in the FIG. 1 embodiment, but this time bearing directly at its free end on the armature 22.

Under normal braking conditions, the components remain in their illustrated positions and braking fluid is supplied from a master cylinder through the inlet 5, an internal passage 18 through the hollow part 37, of the valve element 32, around the insert 11 and through passage 21 to the outlet. When a skid condition is sensed with the brake pressurised from the master cylinder, energisation of the coil 3, attracts the armature 22 which pushes the stem 9 into the passage 18 to isolate the master cylinder from the brake. The pressure differential created causes the now predominant inlet pressure to move the piston 30 to the left relative to the now stationary valve element 32, thereby compressing the spring 34 to store force derived from the master cylinder pressure, which force acts to cause rapid retraction of the armature 22 upon de-energisation of the coil, as described for FIG. 1. A spring 39 is provided between the piston 30 and insert 11 to prevent engagement of the stem 9 in the passage 18 when the coil is de-energised. Flow control can be achieved, if desired, by a groove arrangement similar to that of FIG. 1A.

In the embodiment illustrated in FIG. 4, a piston 40 is again arranged to be subject to the inlet pressure a the inlet 5, being slidable in a bore 41 of the body, within which a shoulder 42 is formed at the junction between the bore 41 and a smaller diameter continuation 43 thereof. The valve stem of the previous embodiments is replaced by a hollow tubular valve member 44 secured and sealed co-axially within the piston 40 and extending with clearance through a yet smaller diameter continuation 45 of the bore 43 such that its free end is adjacent to the spring and washer assembly 26–28 associated with the armature 22 and similar to that of FIG. 1. In this embodiment however, the washer 26 not only acts as an abutment, but also forms a valve seat for engagement by the tubular valve member 44. The washer is conveniently made of plastics material to facilitate sealing against the end of member 44. The tubular member 44 provides a fluid passage 44A between the inlet 5 and a chamber 19A communicating with the outlet 19. Axial and radial passages 40A, 40B in the piston connect the tubular member to the inlet when the piston 40 is in its illustrated rest position.

Energisation of the solenoid moves the armature 22 to the right against the core 6, resulting in engagement of the washer 26 with the end of the valve member 44 to close the passage 44A. The then predominant inlet pressure acting on the piston 40 compresses the spring 27 carried by the armature 22 to provide a solenoid release force, as described previously.

A flange 40C of the piston contacts the body 1 when the piston is under pressure and prevents the valve member 44 from following the valve seat upon de-energisation of the solenoid, thereby ensuring the desirable sudden rapid opening of the valve. One or more grooves may be provided in the face A of the flange 40C and co-operation thereof with the opposed face B of the body provides flow control during initial opening of the valve for the purpose referred to previously. A spring 46 urges the piston to the right to prevent engagement of the tube 44 with the washer 26 when the coil 3 is de-energised.

Figure 4:
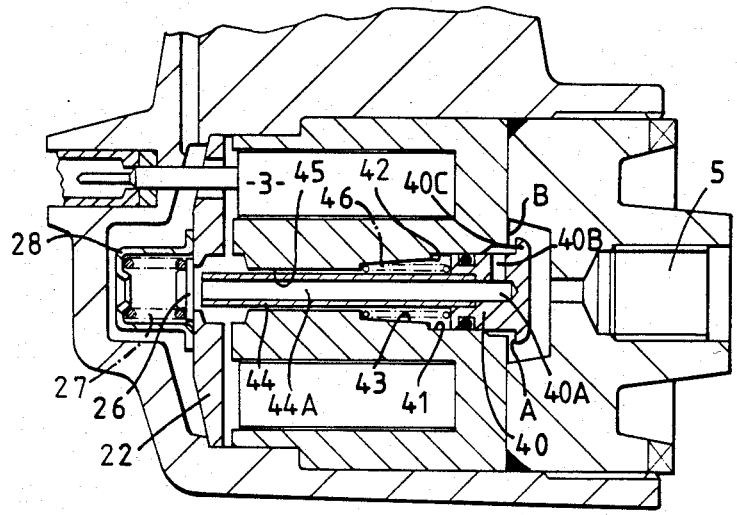
Figure 5:
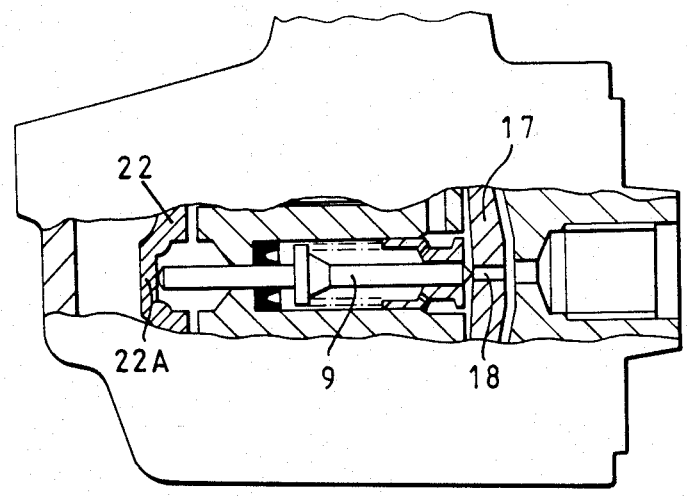

As an alternative to storing the armature release force in a spring loaded by the predominant inlet pressure force applied, for example, via the diaphragm of FIG. 1 or the pistons of FIGS. 3 and 4, it is possible to apply the inlet force directly to the armature. An example of such an arrangement is illustrated in FIG. 5 which may, for example, be identical to FIG. 1 except for the part illustrated in detail. It will be seen that the valve stem 9 abuts directly against a solid wall portion 22A of the armature 22 such that the predominant force of the inlet pressure arising from pressure differential across the diaphragm 17 is applied direclty via the stem 9 to the armature 22 when the port 18 is closed by the stem 9 upon energisation of the energised coil 3. This force ensures rapid disengagement of the armature when the coil is de-energised. Flow control upon de-energisation is achieved in the manner described for FIG. 1, although the onset of this control is delayed in the FIG. 5 embodiment since the diaphragm cannot move to the left until the armature is released by the coil 3, permitting the valve 9, 18 to open.

Figure 6:
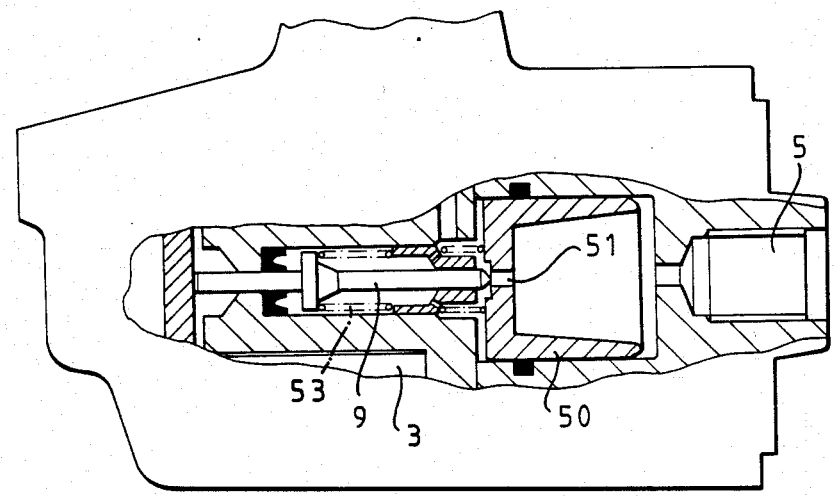

The embodiment of FIG. 6 employs the direct force application principle of the FIG. 5 arrangement, but uses a piston 50 in place of the diaphragm of FIG. 5. The piston 50 is hollow and provided with a port 51 in its inner end wall 52, the port co-operating at one side with the inlet 5 and at the other side with the adjacent end portion of the stem 9 in the manner described previously. When, upon energisation of the coil 3, the stem 9 is moved to the right to close the port 51, the inlet pressure force on the piston 50 is applied along the stem 9 to the armature 22 and acts, as described previously to cause rapid disengagement of the armature when the coil is de-energised. A spring 53 acts between the piston and insert 11 to ensure that the piston is held away from the stem 9 in order to maintain the port 51 open when the coil is de-energised. Any required flow control is again achieved by the provision of one or more grooves in the piston face 50A and/or the opposed face 12 of the insert 11, but the flow control is subject to the same delay as in the FIG. 5 embodiment because of the limitations imposed by direct loading of the armature 22 from the piston 50.

The aforesaid principle embodied in FIGS. 5 and 6 can be used in a variant of the FIG. 4 embodiment, illustrated in FIG. 7, by again arranging for the tubular element 44 to engage the armature 22 directly, preferably with the interposition of a slightly resilient insert 22A to form a valve seat, although this may be omitted if a satisfactory seal can be obtained by direct engagement of the tube with the armature (FIG. 5) or other means. When the coil 3 is energised, the end of the tube 44 engages the armature seat 22A so as to isolate the outlet from the inlet 5, causing application of force derived from the then predominant inlet pressure to the armature for quick release of the latter, as described previously. Flow control is achieved in the same manner as the FIG. 4 embodiment and subject to the limitations described in connection with the latter.

Figure 7:
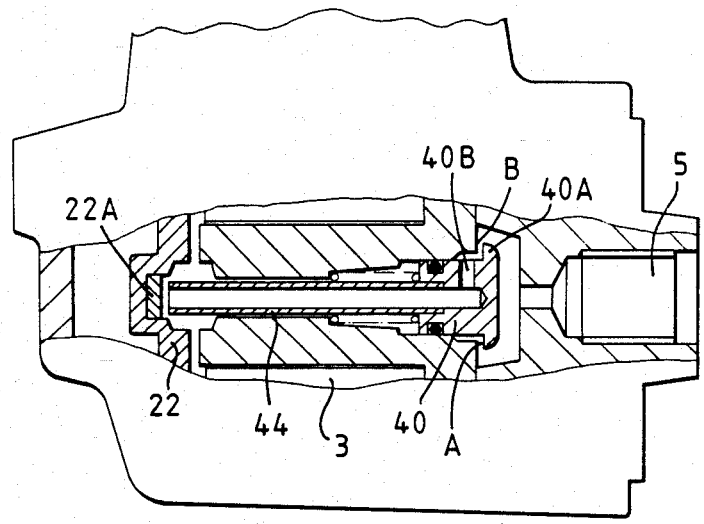

In a variant of FIG. 7, the head 40A of the piston 40' may be omitted, together with the radial passage 40B and leftward movement of the piston 40 is then limited by engagement of the piston with an internal shoulder of the housing to ensure separation of the end of the tube 44 from the opposed valve surface of the armature upon de-energisation of the coil. No flow control is obtained with this variant, since the inlet communicates directly with the tube 44.

Although the embodiments described above are adapted for use in anti-skid braking systems the valve of the invention may be used for other purposes, such as fuel injection, for example, the flow control characteristics being selected appropriately for the required manner of use.

I claim:

1. An electrically operated valve comprising an armature displaceable by an electrical motive device from a rest position to an operative position, a pressure-responsive device subject, in use, to an inlet pressure via a pressure fluid inlet, and a valve element acting, upon displacement of the armature towards its operative position as a result of actuation of said motive device, to close a port between the pressure inlet and a pressure outlet to a working system so as to isolate said inlet and outlet from one another, said pressure-responsive device being subjected to a pressure differential as a result of closing the port, and being displaceable under the effect of a force derived from the then predominant inlet pressure, causing said force to be transmitted by force transmission means to load the armature towards said rest position.

2. A valve according to claim 1 wherein the valve element serves as said force transmission means.

3. A valve according to claim 1 wherein said port is formed in said pressure-responsive device and is closed by engagement therein of said valve element which then acts to transmit said force to load the armature.

4. A valve according to claim 1 wherein said force transmission means applies said force to stress a spring which is arranged so that, when so stressed, it loads the armature towards said rest position.

5. A valve according to claim 1 wherein said force transmission means acts to load the armature directly.

6. A valve according to claim 1 wherein the pressure responsive means is of disc-like form and resists significant deflection under the effect of rapid transient pressure differential, but deflects to load the armature when an established pressure differential occurs.

7. A valve according to claim 6 wherein the pressure-responsive means deflects against a fixed surface under the action of the inlet pressure when said port is closed, and flow control means acts between said inlet and outlet, when said port is reopened, to control the rate of pressure re-application through the outlet.

8. A valve according to claim 7 wherein said flow control means is at least one groove in said fixed surface.

9. A valve according to claim 1 wherein the pressure-responsive means is a piston movable in a chamber communicating with the fluid pressure inlet.

10. A valve according to claim 9 wherein the piston contains a valve seat member and a spring arranged so that, when the valve member is engaged with the seat member under the action of said motive device so as to isolate said inlet and outlet from one another, movement of the piston under the effect of the then predominant inlet pressure stresses the spring to load the armature towards its rest position.

11. A valve according to claim 1 wherein the pressure responsive device and armature are arranged at opposite sides of the motive device and the force transmission member extends through the motive device to transmit said force to the armature.

12. A valve according to claim 1 wherein the valve element is secured to the pressure responsive device for movement therewith and co-operates with a valve seat on the armature.

13. A valve according to claim 12 wherein the valve element is hollow and forms a communication passage between the inlet and outlet when the valve element is not engaged with said seat.

14. A valve according to claim 12 wherein the pressure-responsive device is a piston movable in a chamber communicating with the fluid inlet.

15. A valve according to claim 14 wherein movement of the piston under the action of the inlet pressure is limited by engagement of a flange of the piston with a fixed surface.

16. A valve according to claim 15 wherein one or more flow control grooves are provided between said piston flange and said fixed surface for controlling the rate of pressure re-application through the outlet.

17. A valve according to claim 12 wherein the valve element extends through the motive device with clearance to provide a passage connecting the low-pressure side of the piston to a relatively low pressure area.

* * * * *